(12) United States Patent
Bradley et al.

(10) Patent No.: US 11,507,983 B2
(45) Date of Patent: *Nov. 22, 2022

(54) PRIVACY-BASED CONTENT TRACKER

(71) Applicant: Amazon Technologies, Inc., Reno, NV (US)

(72) Inventors: Andrew J. Bradley, Edinburgh (GB); Árdís Elíasdóttir, Edinburgh (GB); Anthony Richard McBryan, West Lothian (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/142,602

(22) Filed: Jan. 6, 2021

(65) Prior Publication Data

US 2021/0158403 A1 May 27, 2021

Related U.S. Application Data

(63) Continuation of application No. 15/825,966, filed on Nov. 29, 2017, now Pat. No. 10,943,269.

(51) Int. Cl.
*G06Q 30/02* (2012.01)

(52) U.S. Cl.
CPC ..... *G06Q 30/0275* (2013.01); *G06Q 30/0246* (2013.01); *G06Q 30/0277* (2013.01); *G06Q 2220/00* (2013.01)

(58) Field of Classification Search
CPC ............... G06Q 30/02; G06Q 30/0275; G06Q 30/0246; G06Q 2220/00; G06Q 30/0207–30/0277
See application file for complete search history.

(56) References Cited

U.S. PATENT DOCUMENTS

| 7,876,748 | B1 * | 1/2011 | Conner | G06F 16/2255 370/389 |
| 8,180,844 | B1 * | 5/2012 | Rhoads | G06F 16/434 709/217 |
| 8,527,333 | B1 * | 9/2013 | Chatterjee | G06Q 30/0241 705/14.1 |
| 8,719,396 | B2 * | 5/2014 | Brindley | G06Q 30/0248 709/224 |

(Continued)

OTHER PUBLICATIONS

U.S. Non-Final Office Action issued in U.S. Appl. No. 15/825,966 dated May 4, 2020.

(Continued)

*Primary Examiner* — Thuy N Nguyen

(74) *Attorney, Agent, or Firm* — Hogan Lovells US LLP

(57) ABSTRACT

A computing device is configured to generate a content reference for content displayed on a webpage. An encrypted reference is generated for the content reference. The content is provided, with the content reference, to a client device. A website is provided for the client device upon selection of the content by a user input on the webpage. The website includes an offering and related offerings associated with the content. In accordance with a web action received from the website, a logical table is updated with an entry associated with the encrypted reference. The update may be associated with a credit or a charge based at least in part on the web action for the offering or the related offerings.

20 Claims, 9 Drawing Sheets

(56) References Cited

U.S. PATENT DOCUMENTS

| | | | | |
|---|---|---|---|---|
| 8,849,693 | B1* | 9/2014 | Koyfman | G06Q 30/02 705/14.1 |
| 2004/0044571 | A1* | 3/2004 | Bronnimann | G06Q 30/02 705/14.71 |
| 2004/0133671 | A1* | 7/2004 | Taniguchi | H04L 29/06 709/224 |
| 2006/0265493 | A1* | 11/2006 | Brindley | G06Q 30/02 709/224 |
| 2007/0027770 | A1* | 2/2007 | Collins | G06Q 30/0269 705/14.71 |
| 2007/0179846 | A1* | 8/2007 | Jain | G06Q 30/0255 705/14.53 |
| 2008/0091533 | A1* | 4/2008 | Silverbrook | G06Q 30/02 705/14.49 |
| 2011/0055003 | A1* | 3/2011 | Wang | G06Q 30/0246 705/14.45 |
| 2011/0055053 | A1 | 3/2011 | Wang | |
| 2013/0132201 | A1* | 5/2013 | Mysen | G06Q 30/0274 705/14.54 |
| 2013/0173365 | A1* | 7/2013 | Beighley, Jr. | G06Q 30/0214 705/14.16 |
| 2014/0012669 | A1* | 1/2014 | Heiser, II | G06Q 40/02 705/14.53 |
| 2014/0046758 | A1* | 2/2014 | Grebeck | G06Q 30/0247 705/14.46 |
| 2015/0112803 | A1* | 4/2015 | Heiser, II | G06Q 30/0269 705/14.53 |
| 2015/0348139 | A1* | 12/2015 | Silverman | G06Q 40/12 705/14.71 |
| 2016/0110775 | A1* | 4/2016 | Moiz | G06Q 30/0277 705/14.73 |
| 2016/0371732 | A1* | 12/2016 | Heiser, II | G06F 16/9535 |
| 2016/0371741 | A1* | 12/2016 | Heiser, II | G06Q 30/0251 |
| 2017/0091807 | A1* | 3/2017 | Liu | G06Q 30/0277 |
| 2017/0213246 | A1* | 7/2017 | Shahan | G06Q 30/0255 |
| 2017/0300962 | A1* | 10/2017 | Brown | G06Q 30/0246 |
| 2017/0300989 | A1* | 10/2017 | Sundaresan | G06Q 50/01 |

OTHER PUBLICATIONS

U.S. Notice of Allowance issued in U.S. Appl. No. 15/825,966 dated Nov. 4, 2020.

* cited by examiner

PRIVACY-BASED CONTENT TRACKER

CROSS-REFERENCE TO RELATED APPLICATIONS

This application is a continuation of allowed U.S. application Ser. No. 15/825,966, filed Nov. 29, 2017, entitled "Privacy-Based Content Tracker", of which the full disclosure of this application is incorporated herein by reference for all purposes.

BACKGROUND

A content website, such as an electronic marketplace, includes buyers and sellers. Additionally, such content websites may include content from paid content providers. In an example paid or sponsored content providers include advertisers advertising for retailers or retailers themselves. In contrast, unpaid content providers typically provide content (or unpaid content) in the content websites. The sellers or the unpaid content providers may include brick-and-mortar retailers or retail websites or individual sellers seeking to sell products, content, or services. Unpaid content providers may advertise their own products, content, or services via their own websites or through third party webpages. In such instances, the unpaid content providers may rely on paid content providers (e.g., advertisers), to publish their advertisements on the third party webpages. The paid content providers become buyers and may interact with sellers of electronic content real estate (e.g., advertisement spaces), via an electronic content exchange, where one or more servers are configured to provide real time bidding auctions. The buyers bid for the sellers' electronic content real estate (e.g., advertising space on third party webpages). Bids are submitted and the highest bid wins the right to have their corresponding content displayed on the seller's electronic content real estate.

BRIEF DESCRIPTION OF THE DRAWINGS

Various embodiments in accordance with the present disclosure will be described with reference to the drawings, in which.

DETAILED DESCRIPTION

Figure 1A:
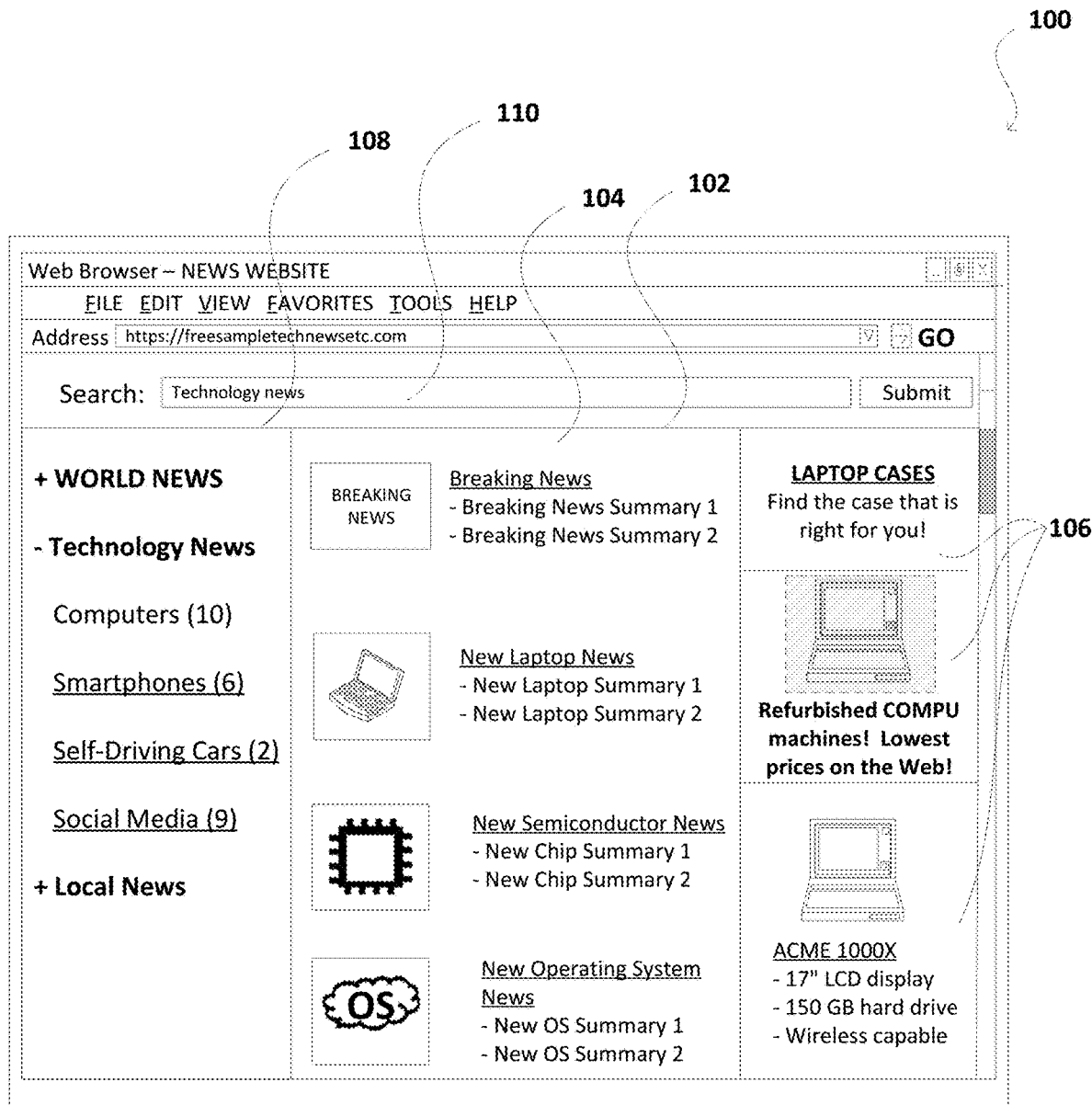
FIG. 1A illustrates a browser window with a webpage representing electronic content real estate to which paid providers' content may be added, in accordance with an example of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the foregoing or other deficiencies experienced in conventional approaches for tracking content references in electronic content. Content references are used interchangeably with content or advertisement identifiers throughout this disclosure unless indicated otherwise. In particular, various embodiments herein describe systems and methods for a technical solution to a computer or network-related problem associated with user tracking via referential linking across web content. For example, in order to properly target users with electronic content and to provide reliable information to secure such electronic content from content providers, the ability to track the lifecycle of such electronic content is beneficial. In a computer or networking implementation, users are typically behind an electronic curtain and are invisible to content providers. The electronic curtain is represented via service providers, routers, modems, and circuitous routing of electronic data through reference links. In the end, many times the reference links are lost between devices and websites and user tracking fails. Moreover, zealous implementation of tracking of content usage by user accounts across websites may be seen as an invasion of privacy.

In another example of a computer or network-related issue in content tracking, the use of static data structures often remove from an ability to provide continuous tracking over the lifecycle of the electronic content. Specifically, in an example, a static data structure would be unable to recognize or adapt to a change in user interest as to different displayed electronic content. In this disclosure, the sellers and unpaid content providers are used interchangeably to refer to providers of products, content, or services which secure revenue for these sellers or unpaid content providers. The sellers and unpaid content providers, however, do not typically receive revenue for activities outside the sale of products, content, or services—such as, for advertising. The buyers are either visitors to the content webpage or registered users of the content webpage.

In an implementation herein to resolve the above computer or network-related problems, the present systems and methods use a hashing algorithm to hash the content identifier (ID) that is provided with a reference link in paid content (e.g., advertisements) on a third-party webpage. The hashed counterpart of the content ID may be referred to as a hash ID. An electronic marketplace may offer products/services for sale on behalf of retailers. The retailers may use advertisement services offered by the electronic marketplace to sponsor advertisements placed on the third party websites. The advertisements are placed in the third-party webpage with the content ID and a hyperlink to the electronic marketplace embedded in the advertisements. The content ID is unique to each advertisement and, accordingly, the corresponding hash ID is unique as well. When an advertisement is selected by a user in the third-party webpage, the hyperlink directs the user to the electronic marketplace providing offerings of the sponsoring retailer and of competing retailers. The user may then purchase a product corresponding to the advertisement of the sponsoring retailer or may purchase a product of a competing retailer. Web actions associated with such a purchase decision is logged via the hashed counterpart of the content ID and the retailer gets a credit or a charge in accordance with the web action. The separation of the content ID and from the hash ID offers privacy to the user throughout the electronic lifecycle of the advertisement without sacrificing tracking data that is beneficial to the retailer sponsoring the advertisement and to the electronic marketplace for processing advertisement revenue.

Various other functions and advantages are described and suggested below as may be provided in accordance with the various embodiments.

FIG. 1A illustrates a browser window 100 with a webpage 102 representing electronic content hosted by the webpage providers. For example, the webpage 102 may be a page from a news website, a social media website, a multimedia website, electronic forums, or any other unpaid content provider pages. In the example website 102, the unpaid content is illustrated in sections 104 and 108. Section 108 is a category section that allows a user to filter the unpaid content of section 104 in accordance with interests stated in category titles of the category section. Sections 106 may be the paid content sections of webpage 102. In an example, the sections 106 are also referred to as slots and may be a different shapes or sizes in accordance with the Interactive Advertising Bureau (IAB®). The different shapes or sizes are standardized, in an example, by width, height, and aspect ratios. For example, banners refer to sections that may be below the header of the webpage 102. Leaderboard-type sections are typically on the top right of the webpage 102. Medium rectangles are another standardized shape that follows along the lines of one or more of sections 106. Moreover, in an implementation, the size of the displayed sections 104-108 may dynamically change while maintaining aspect ratio when the webpage 102 is accessed from different devices of different display sizes.

In order to secure the paid content sections to display paid content (e.g., advertisements), a paid content provider (advertiser) typically participates in a bidding auction with other advertisers. The unpaid provider (e.g., owner of webpage 102 or webpage provider) is the seller of the paid content sections, in this example. The seller provides the sections 106 as electronic content real estate to any entity ready to provide payment and paid content for display. The paid content 106 may be added after the website 102 is published and may dynamically change based on a user's browsing habits or interests in accordance with an example implementation herein.

In an example, a paid provider of the paid content 106 may be a buyer of the advertisement space. Pertinently, the paid provider pays the unpaid provider (or publisher), via the afore-mentioned bidding or auction process, to win the right to place paid content on the website 102. In an implementation, a third party web services provider who is unrelated to either the buyer or seller provider functions as a content exchange or a bidding exchange to interface between the buyer and the seller. As such, the content exchange or the bidding exchange may be a web service for electronic bidding between the buyer and the seller. In the example of FIG. 1A, the paid provider is assumed to be the highest bidder because the paid provider has secured the right to place paid content on the website 102. In an alternate implementation, multiple paid providers may have won the right to place advertisements in different portions of the webpage 102 via a singular bidding or auction process. In such an alternate implementation, each of the multiple paid providers may have all won the right to advertise with a different bid amount, where the smallest winning bid amount securing a right to advertise in the lower right section 106 (advertisement for "ACME 1000X") and the highest winning bid amount securing a right to advertise at the top right section 106 (advertisement for "LAPTOP CASES"). The difference in bid amounts correspond to visibility, with the top right section 106 being more visible when the webpage 102 renders in a browser, than the lower right section 106.

Webpage 102 may be part of a domain or an independent website hosted by the domain. In addition, website 102 may be owned or operated by an electronic or online store that provides its own content 104 relating to products available for sale from the electronic or online store. Alternatively, the website 102 may be a product aggregator, securing unpaid content from different websites, but may also provide room for paid content. Webpages are part of the website and may differ, from other webpages, within the website.

In the example of FIG. 1A, the unpaid provider (a publisher or owner) of the webpage 102 may track its users or consumers using cookies, logging information, or monitoring scripts. Such cookies, logging information, or monitoring scripts may be provided from a server of the publisher or the owner to a client device rendering the website 102. When rendered, the website 102 stores the cookies, logging information, or monitoring scripts in a local temporary cache or persistent storage of the client device. The cookies, logging information, or monitoring scripts function to transmit, back to the server, certain information representing browsing or usage information for the client device and the browser.

Periodically, or when requester or permitted, the website 102 may include operational scripts to transmit portions of the cookies or logged information to the server of the publisher or owner. Alternatively, if a callback function is defined, then the operational scripts may provide the cookies or the logged information to one or more unrelated parties via a network or internet connection. The cookies or the logged information is useful for paid content providers because it allows the paid content providers to place targeted content intimate to the users into webpages that the user is browsing. The users are more likely to interact with this content than random paid content. When such content is advertisements, the users are likely to make a purchase by interacting with the content. Accordingly, browsing habits of one or more users of the client device, the browser, and certain websites, as well as certain configuration aspects of the client device are provider to a server to enable targeted paid content. The tracking information may extend beyond the website 102 to other websites browsed on the same client device or the same browser. In an implementation, the configuration aspects of the client device may include a type of the browser, a type of operating system of the client device, an internet connection service provider for the client device, and other related information.

The logged or tracking information referenced above, at least as to the paid content in sections 106, may include content IDs (or advertisement IDs, which are used interchangeably in this disclosure). However, as previously explained, the systems and methods herein enable an order of privacy to users of the webpage 102. For example, even if a user were to select an advertisement from sections 106, the use of an encrypted or hashed counterpart of the content IDs to track the advertisement prevents the users' browsing patterns from being available to an advertiser providing the advertisement.

In an exemplary aspect, when website 102 includes advertisement slots 106 for paid publishers' content, the advertisements may be related to the website owner's content 104 or the search request in search area 110. Alternatively, the advertisements 106 are related to browsing habits of a user or consumer of the website owner's content 104. To implement targeted advertising, an advertising or content server may provide the advertisements or content even if distinct from the advertiser. For example, the adverting or content server may react automatically to tracked content IDs, but may not provide such information to the advertisers by virtue of the hashed ID separation described above. As illustrated in FIG. 1A, when the search request in search area 110 is for TECHNOLOGY NEWS, the website owner's unpaid content 104 is associated search results that are responsive to the search request. Scripts, as previously described, track the search requests and/or other user/consumer information and provide this to an advertiser or content server. The advertiser or content server or a third party server then provides advertisements (as paid content) associated with the search requests and/or other user/consumer information for publishing in the slots for paid publisher's content 106.

A content server, such as an electronic marketplace functions as an intermediate between users of the electronic marketplace (customers of products/services/unpaid content), the third party website displaying paid content (e.g., advertisements relating to the products/services/unpaid content sold from the electronic marketplace), and the retailers (e.g., content providers selling their products/servicers/unpaid content in the electronic marketplace). The content server maintains the privacy of the user and provides anonymous tracking data to the retailers via the above-mentioned encrypted identifier, thereby separating user actions from the tracking data. The content server also offers to place advertisement or paid content on behalf of the retailers (i.e., the unpaid content providers who provide web content or products and services). User actions are also referred to herein as actions or web actions and encompass actions that indicate user interest in an offering or related offerings displayed in the electronic marketplace or webpage offering unpaid content. For example, the action may be a click within the electronic marketplace on an offering sponsored by the advertiser or a related offering of a competing retailer may be logged as an action for the user and the corresponding advertisement ID. The click may be associated with opening of a webpage displaying information and purchase options for the offering or the related offerings. In another aspect, the action is a purchase (or renting or securing in any manner) of the offering or the related offering.

Figure 1B:
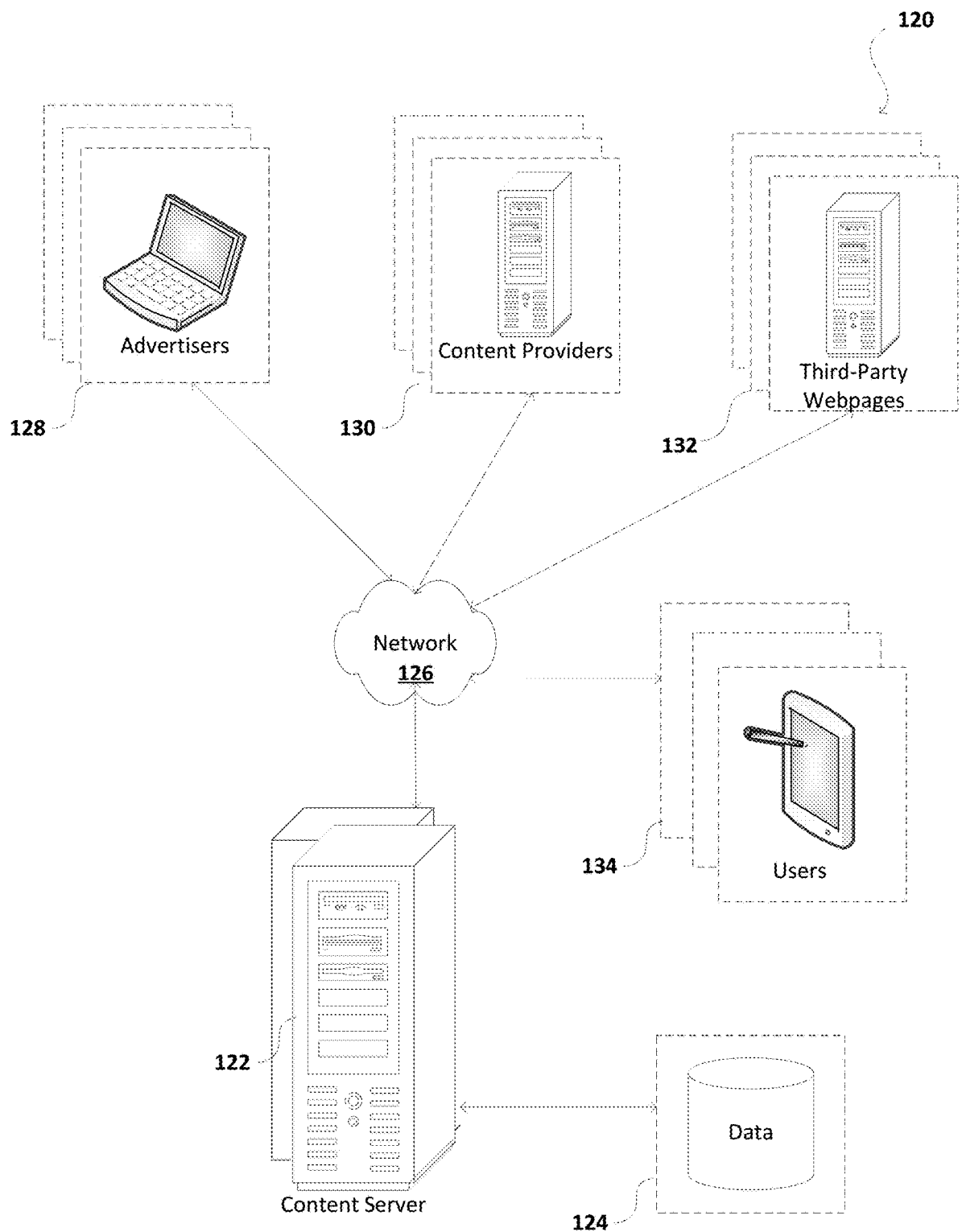
FIG. 1B illustrates an example environment for publishing paid and unpaid content, in accordance with an example aspect of the disclosure herein.

FIG. 1B illustrates an example environment 120 for private content tracking in accordance with various embodiments. The example environment 120 illustrates example computing components and network relationships that are applicable for offering privacy to user of website 102 of FIG. 1A, while also privately tracking content through its lifecycle. The example environment 120 includes: a content or an advertisement server 122 for (a) hosting content, (b) tracking and processing content through its lifecycle, and/or (c) performing bidding tasks (e.g., as an ad exchange server); advertisers (paid content providers) 128; content providers 130 (also referred to herein as retailers or unpaid content providers); unpaid content publishers (e.g., third-party websites websites) 132; and users with computing devices 134 that are applicable for accessing the paid and the unpaid content. In addition to tracking and processing content, the advertisement or content server 122 may provide its own content or its own retailing options. Further, the content server 122 is only illustrated as a single server for purposes of simplicity herein, but a person of ordinary skill would recognize that multiple servers performing specific functions may comprise the content server 122. Such multiple servers include an applications server, a database server (in combination with database 124), a frontend server, a processing server, etc.

Advertisers 128, content providers 130, and unpaid content publishers 132 utilize respective computing systems and/or devices to interact with the content server 122 through network 126, for example, a local area network (LAN) or wide area network (WAN), e.g., the Internet. Similarly, users with computing devices 134 utilize their respective computing device to access content (e.g., websites) hosted via the content server 122 or the third-party webpages 132 over the network 126. Such websites may include electronic marketplaces with products from the content providers 130 hosted in the content server 122. Third-party webpages 132 include unpaid content such as news, social media, forums, unrelated marketplaces than the above-references electronic marketplace, etc., Such third-party webpages 132 can include paid content (e.g., advertisements, paid product reviews, etc.) that is accessible over the network 126 (e.g., the Internet). For example, an unpaid content publisher, via the third-party webpages 132, may utilize one or more computing systems to provide the above-referenced combination of paid and unpaid content that is accessible through the network 126. The computing devices and/or systems for each of the content server 122, advertisers 128, content providers 130, third-party webpages 132, and users with computing devices 134 will each generally include memory for storing instructions and data 124, and at least one processor for executing the stored instructions. Such stored instructions may specifically configure the processor and the respective computing devices and/or systems to perform functions detailed in this disclosure.

In an example implementation, content providers 130 may request advertisements from advertisers 128 to incorporate products or services offered by the content providers. The content server 122 may host these advertisements and select third-party webpages 132 to publish the advertisements. Content server 122 may provide its own bidding or auction process for content providers participating in its electronic marketplace. Alternatively, content server 122 performs bidding on behalf of content providers 130 to advertisers 128 that then publish the winning advertisements to the third-party webpages 132. In such an alternative implementation, advertisers 128 may include an advertisement exchange server to perform the bidding and selection of winners and slots in one or more third-party webpages 132 to publish the winning advertisements. Furthermore, the content server 122 maintains the hash ID separated from the content ID provided to the advertisers 128 to use with advertisements published to third-party webpages 132. In this manner, as selection of the content or the advertisement finally leads to the electronic marketplace, the content server 122 is able to track the lifecycle of the content or the advertisement via the advertisement or content ID.

In another example, the content ID is provided with the paid content from a content provider (and hosted in the content server—e.g., the electronic marketplace). The content ID is, however, maintained as distinct and separate from its hashed counterpart using logical tables with appropriate separation as discussed at least with reference to FIG. 3 in this disclosure. The use of such logical tables to reference between the two types of IDs promotes privacy to the user and maintains the privacy as the user is transferred from the third-party webpage displaying the paid content or advertisement to a website providing offerings related to the paid content or advertisement. In an implementation where the paid content is an advertisement for a retailer's branded computer offered via the content server, the third-party webpage displays the advertisement with an embedded advertisement ID to track the lifecycle of the advertisement.

In the above example, when a user clicks on the advertisement, the reference link (e.g., hyperlink), causes a web site such as an electronic marketplace (i.e., content server) to be displayed to the user. The electronic marketplace offers the retailer's branded computer for sale, along with other branded computers from other retailers, including competitors. When the user performs a web action in the electronic marketplace to secure the branded computer, the web action causes the systems and methods herein to register a charge to retailer via the hashed counterpart of the advertisement ID that may be visible to the retailer. When the user performs a web action to secure a different retailer's computer other than the branded computer (e.g., a competitor's computer), the web action causes the systems and methods herein to register a credit to retailer via the hashed counterpart of the advertisement ID. In this manner, the content server maintains the privacy of the user and provides anonymous tracking data via the separation of the content or advertisement identifier. In a further example, the credit may be reused to create new content or sponsor new advertisements for the retailer.

The above example also drives a level of privacy between the parties involved in the content usage. The user's browsing process is not tracked by the retailer because the content ID (or advertisement ID) is separate and distinct form the hashed counterpart, and also because the tracked information is logged separately using the hashed counterpart. The content provider is shielded from the user throughout the lifecycle of the content ID using a dynamic database structure that maintains a logical separation of the content ID and its hashed counterpart as described in the following example implementations in this disclosure. Furthermore, the present systems and methods rely on machine learning to adapt or change the displayed content on websites in accordance with the anonymous data collected over multiple lifecycles of content or advertisement IDs. For example, the advertisement ID may be embedded in the uniform resource locator or identifier (URL/URI) of webpages within the website. The advertisement ID may be maintained for a user as the user enters the website from an advertisement. In an implementation, the advertisement ID may be associated with a session ID or a cookie to enable tracking through its lifecycle—for example, through multiple webpages of products or services till a purchase or other web action is completed at a checkout page. As a result, the present implementation ensures that the user may browse multiple webpages in the website, but that the advertisement ID may be tracked across the webpages till a final action is complete.

Figure 2:
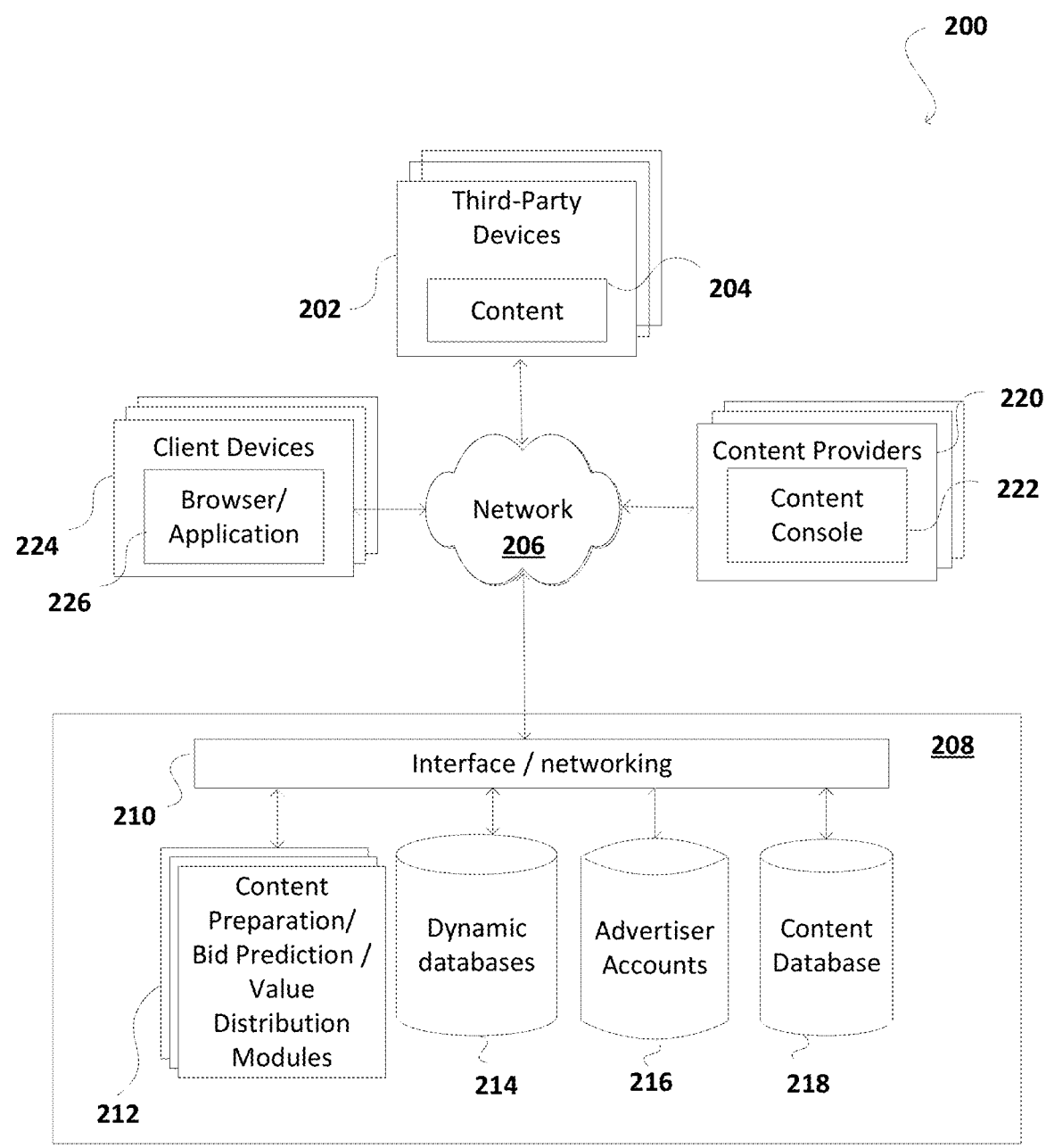
FIG. 2 illustrates an example system architecture for privately tracking content references or identifiers in accordance with various aspects of this disclosure.

FIG. 2 illustrates an example system architecture 200 for privately tracking content references or identifiers in accordance with various aspects of this disclosure. The system architecture 200 includes third-party devices 202 in communication with content providers 220, with client devices 224, and with content server 208, via network 206. Client devices 224 can include any processor and memory based electronic devices with capabilities as disclosed herein, but at least with the capability to execute computer-readable instructions for a browser or stand-alone applications with or without a browser. These electronic devices are described in detail below and include specific configuration to perform the functions herein. Such electronic devices may include personal computers, tablets, ultrabooks, smartphones, cell phones, wearable watches and related devices, handheld messaging devices, laptop computers, set-top boxes, personal data assistants, electronic book readers and the like. Each of these electronics devices may be configured to include a browser or a stand-alone application 226 that is capable of being configured in the manner of this disclosure.

In an implementation, third-party devices 202 can include any processor and memory based electronic devices with capabilities as required in the disclosure herein, but at least with the capability to execute computer-readable instructions generating webpages or web-based application content not requiring a browser. Such devices may be servers or related computers capable of handling web traffic for hosted webpages or domains. Third-party webpages use the devices 202 to incorporate paid and unpaid content 204 and to provide webpages with the incorporated content 204 to requesting client devices 224 via the network 206. User or consumers of electronic or online products and/or services use browsers or applications 226 in the client devices 224 to interface with the webpages and to interface with websites provided from content server 208.

The network 206 can include any appropriate network, including an intranet, the internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such system architecture 200 can depend at least in part upon the type of network and/or environment selected. Protocols and components for communicating via such a network are well known and will not be discussed herein in detail. Communication over the network 206 can be enabled via wired or wireless connections and combinations thereof. In this example, the content server 208 may include one or more local servers in communication with each other through interface/network module 210 and with other remote servers through the network 206. In an example, the content server 208 includes a web server for receiving requests and serving content from the client devices 224 or to communicate with content providers 220 that provide content (e.g., products, services, electronic content, etc.) to be hosted on the content server 208. The content providers 220 may rely on content console 222 (e.g., a standalone internet enabled application or a browser) to provide the content to be hosted on the content server 208. In response thereto, although for other networks, an alternative device serving a similar purpose as any one of the content server 208 could be used, as would be apparent to one of ordinary skill in the art upon reading this disclosure.

The content server 208 includes at least one processor and memory including instructions to configure the content server 208 to perform functions described throughout this disclosure. For instance, the at least one processor may include processor cores to execute instructions in related memory storage that perform functions described in modules 212—for content preparation, bid prediction, and value distribution. Additional memory, separate from the memory storing instructions, in the content server 208 supports dynamic databases 214, advertiser accounts 216, and content database 218. As previously described, advertisements may be created by content providers 220 to sell their products or services via an electronic marketplace hosted in the content server 208. Such advertisements are processed via the content preparation part of modules 212. The advertisements are to raise awareness to their products or services hosted in the electronic marketplace. The advertisements may then be stored in the advertiser accounts 216 and made available, after processing in modules 212, to the third-party webpages of the third-party hosting servers 202. The information and offering as to the products and services may be stored in the content database 218 that is accessible to the content providers 220. In a further aspect, individual users on some client devices 224 may also access the content server 208 via Application Programming Interfaces (APIs) or a local account to offer individual products or services to other user of other client devices 224.

As to functionality, in an example, when executed by the at least one processor, the instructions modules 212 cause the content server 208 to generate a content identifier (ID) or an advertisement ID for an advertisement. A reference link is also generated for the advertisement and to be incorporated (e.g., embedded) with the advertisement displayed on a webpage. The reference link references an offering in an electronic marketplace hosted in the content server 208. In an example, the reference link may be a hyperlink. As previously described, the offering in the electronic marketplace may be provided from the content providers 220 or may be natively provided from the content server 208. In an example, the offering may be products or services and the content providers 220 may be retailers or service providers of the products or services. In such an example, natively provided content are direct products or services offered by owner or host of the content server 208.

From the content ID (also referred to herein as advertisement ID, content reference or advertisement reference), the content server 208 generates a one-way hash ID (also referred to herein as a hash ID or an encrypted reference). In an example, the one-way hash ID is generated, calculated, or determined by applying a hashing algorithm to the content ID that is provided as an input. The content ID may include alphabets, numerals, or alphanumeric values. The hashing algorithm provides the one-way hash ID as an output. In a further aspect, the hashing algorithm supplies a secret value to the content ID which is then hashed and a hash value is attached to the content ID to provide the one-way hash ID. The secret value is later used to compute the hash value to determine the content ID from the one-way hash ID for verification.

The content server 208 associates the content ID and the one-way hash ID in a logical table and assigns the one-way hash ID as a key in the logical table. In an example, the content server 208 creates the logical table to include logical rows and logical columns. For example, using the content preparation section of module s 212, the logical table is created in the dynamic database 214. In the logical table of the dynamic database 214, a first predetermined number of the logical columns are configured to function as dynamic logical columns and a second predetermined number of the logical columns are configured to function as static logical columns. The instructions executed in the at least one processor cause the content server 208 to associate the one-way hash ID with a cell of an individual static logical column and with cells of a plurality of dynamic logical columns. When the content ID is associated with an advertisement, a temporary encrypted reference from the content ID is generated using the above-referenced hashing algorithm. An association of the temporary encrypted reference and the encrypted reference is determined and this is used to dynamically change contents of a cell associated with the encrypted reference in the logical table. Such temporary encrypted reference may be stored in a buffer and may be destroyed after the dynamic change to the contents of the cells is complete. For example, on receiving information indicative that the web action resulted in securing of a product associated with the content reference, the contents of cells associated with the encrypted reference within the plurality of dynamic logical columns is dynamically changed to reflect the credit or the charge. Thereafter, this information is used to provide the advertisement as the paid content in third-party webpages.

The content server 208 is also configured to provide the electronic marketplace for the client device upon activation of the reference link from a client device. In an example, activation of the reference link may be by a user input click, by the user hovering a cursor over the paid content (for an instant or an extended period), or by the user providing an interactive response indicative of interest in the paid content to cause the electronic marketplace to be displayed. The electronic marketplace provides, on a display in the client device 226, the offering associated with the advertisement (and the embedded reference link) and also displays related offerings. An example of this is provided in FIG. 4 and described in the corresponding discussion for the figure. After providing the electronic marketplace, the content server 208 is configured to determine that a web action associated with the electronic marketplace has occurred. In an example, such a web action may be a selection of an option to secure a product or service via purchasing, renting, leasing, borrowing, or any other suitable process. The web action may be a selection of a button, an entry in a form, or a suitable input that is captured by scripts in the webpage or web-enabled application 226 and provided to the content server 208.

In an example implementation, in accordance with the web action, the logical table in the dynamic database 214 is updated with information associated with the web action. However, as the logical table references the advertisement via the one-way hash ID, the content preparation module of modules 212 is configured to perform a verification that the web action corresponds to the one-way hash ID. The verification process may use the above-described process of a secret value applied to the content ID of the advertisement to generate the one-way hash ID for verification. Once verified, the update to the logical table is by writing the information associated with the web action to a logical region of the logical table and is referenced by the one-way hash ID. Such information includes that the web action was to secure the offering relating to the advertisement or the related offering.

When the web action secures the offering provided by a retailer that also provided the advertisement, then the retailer is charged for the advertisement. When the web action secures one of the related offerings provided by other retailer than the retailer providing the advertisement, then the retailer providing the advertisement is provided a credit for driving user traffic and the purchase benefit obtained by the other retailers. As a result, the content server 208, via the value distribution module in modules 212, provides a charge or a credit to the advertiser associated with the advertisement based at least in part on the web action for the offering or the related offerings. The above example implementation ensures a separation in what the retailer may see in the advertiser accounts 216 as to identifier (hash ID) that secured the credit or charge—against the actual advertisement ID that was in the actual advertisement. The advertiser is, therefore, able to receive the appropriate credit or charge, while a user securing a product or server after selecting the advertisement remains hidden from the advertiser and retains privacy in the process.

Figure 3:
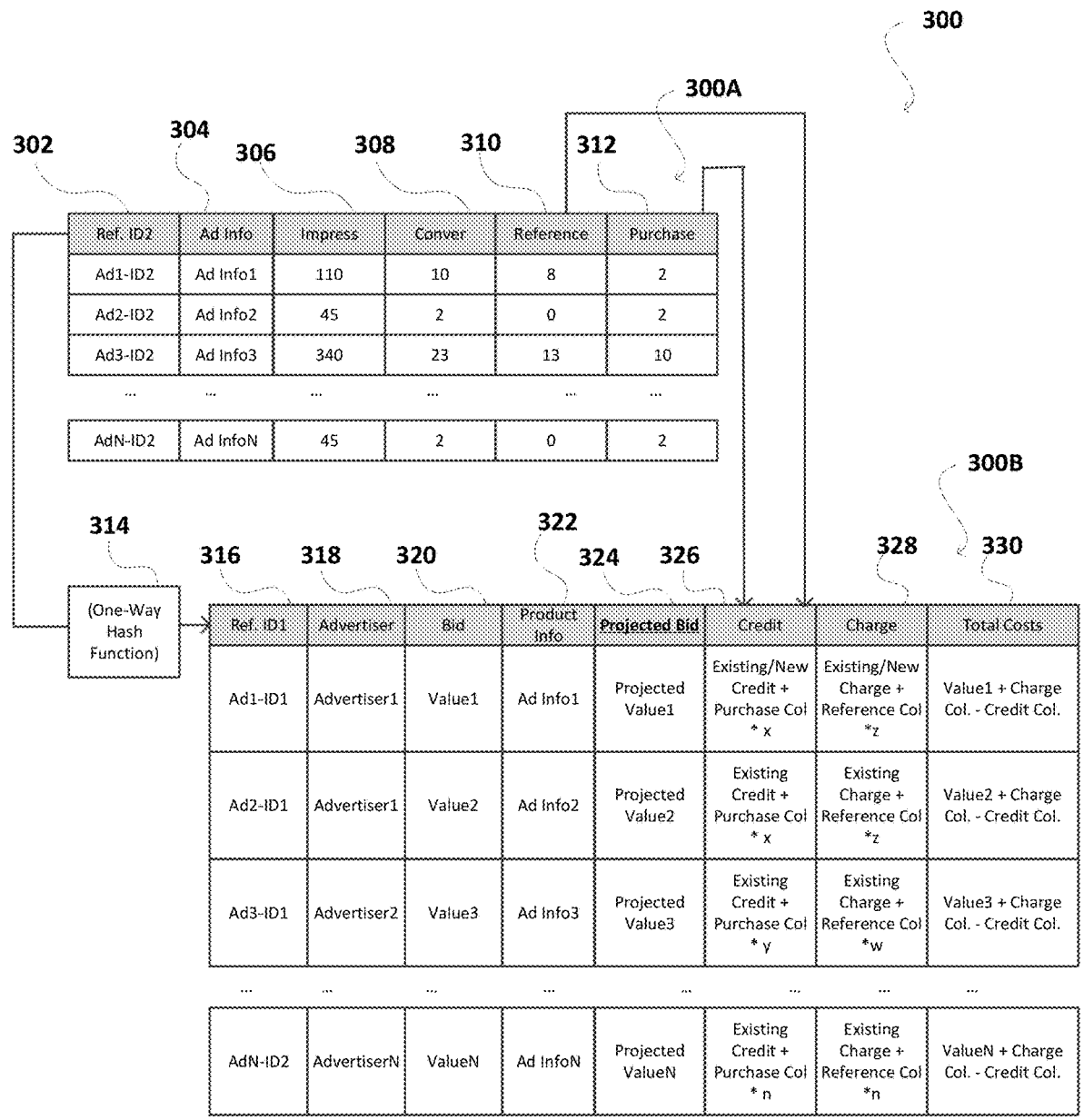
FIG. 3 illustrates an example data structure with dynamic fields for privately tracking content references or identifiers in accordance with various embodiments.

FIG. 3 illustrates an example data structure 300 with dynamic fields for privately tracking content references or identifiers in accordance with various embodiments. Initially, the example data structure 300 is illustrated as separate tables 300A and 300B, but a single table with interlinks is available should an implementation desire to provide such a table. In such a single table, the separation of sections relevant to table 300A and to table 300B may be implemented by locking pertinent sections or by limiting access using a single primary key. For example, the REF. ID2 302 and REF. ID1 316 may be designated as primary keys in their respective tables 300A and 300B, or as a primary key in one table and a corresponding foreign key in the other table. In a single table implementation, pointers may be applied with a hashing algorithm 314 called for each pointer during a look-up or verification process.

Table 300A includes a predetermined number of static logical columns and a predetermined number of dynamic logical columns. For example, column REF. ID2 302 and AD INFO 304 may be static logical columns, while IMPRESS (i.e., impressions) 306, CONVER (i.e., conversions) 308, REFERENCE 310, and PURCHASE 312 may be dynamic logical columns. The AD INFO 304 includes location of advertisements, such as the webpages provided with the advertisements and pointers to the storage location of the advertisements. In addition, AD INFO 304 may include the content of the advertisements itself and reference link information for the advertisements. Much of Table 300A may be seen as information gathered in real time as the advertisements are active in one or more webpages. Impressions 306 pertain to a count of the display of advertisements in the webpages; conversions 308 pertain to the number of times the advertisement has managed to secure a visitor to a content website—i.e., the electronic marketplace. In an aspect of the present disclosure, the conversions 308 may measure the actual end result of the visitor's time spent on the content website. For example, when the visitor performs a web action to an offering underlying the advertisement—e.g., selects to buy a product associated with the advertisement—then the web action counts as conversion. The web action also counts as a PURCHASE 312. Similarly, when the visitor performs a web action to a related offering than the advertisement—e.g., selects to buy a related product than the product in the advertisement—then the web action still counts as conversion, but this web action also counts as a REFERENCE 310. There may be instances where the web action is a conversion but does not count as a reference or a purchase—e.g., when the visitor spends time beyond a threshold time reviewing content in the content website, or when the visitor browses beyond a threshold number of pages, sections, or lengths of content in the content website.

Table 300B provides static and dynamic logical structures data that may be generally visible to the content provider (i.e., advertiser or retailer sponsoring the advertisement for their offerings). In an example, the REF. ID1 316, ADVERISER 318, PRODUCT INFO 322, BID 320 may be static logical columns, while PROJECTED BID 324, CREDIT 326, CHARGE 328, and TOTOAL COSTS 330 may be dynamic logical columns. The PRODUCT INFO 322 provides location of advertisements and product details, such as the webpages provided with the advertisements, as well as the content of the advertisements and reference link information. REF. ID1 302 may be a linked to REF. ID2 302 (as foreign and primary keys) via the one-way hash function 314. In an implementation an algorithm supporting a private-public key encryption or other related encryption processes may be applicable in a similar manner as the one-way hash function. The CREDIT 326 or CHARGE 328 may reflect individual entries at each CREDIT or each CHARGE, or may reflect accumulated values over a predefined time period. As a result, the EXISTING/NEW CREDIT or CHARGE entries in the first row may reflect to use a zero NEW CREDIT or the EXISTING CREDIT (or CHARGE) over which to accumulate additional CREDIT (or CHARGE).

ADVERTISER 318 provides the advertisers (i.e., the above-reference retailers or content providers) that provide the advertisements. CREDIT 326 includes a formula for dynamically calculating credits for every reference provided by an advertisement published on behalf of a corresponding advertiser, when a user ended up purchasing a related (or competing) product or service than the advertiser's product or service. As a result, CREDIT 326 is updated, via the value distribution module in modules 212 of FIG. 2, by any references listed in the REFERENCE 310 entry for the corresponding advertisement ID 302. Such a process relies on a look-up or verification provided by the modules 212 to verify that an advertisement with an advertisement ID (i.e., Ad1-ID2 . . . AdN-ID2) from table 300A that hashes to a hash ID (i.e., one from Ad1-ID1 . . . AdN-ID1) in table 300B. Upon such a confirmation or completion, the corresponding credit entry is updated. In an example, the update provides a count of the reference, but an embedded value for each reference provides a currency value—i.e., 2 references * $1.00 per reference=$2.00 credit. The embedded value may be changed but provides an automated basis to calculate the credit or charge. This is demonstrated as the X, Y, Z, and W values in each of columns 326 and 328 of table 300B. Accordingly, these values (e.g., $1.00 per reference or $2.00 per purchase) may be changed to reflect the real-time costs in accordance with the corresponding predicted bids in column 320. Further, the PURCHASE 312 entries update the CHARGE 328 entries after a lookup. Total costs or benefits from the content lifecycle tracking are provided by the BID entries 320 for each advertisement, summed with the CHARGE entries 328, and having the CREDIT entries 326 applied. In a further aspect, the embedded value for each charge or credit entry in columns 326 and 328 may be variable depending on a multitude of factors not limited to: (a) time of day of advertisement, (b) number of advertisements, (c) number of references or purchases; (d) amount of the bid value, etc.

In another embodiment, the data collected in the data structure 300 is used to project bid values to enable an advertiser (i.e., retailers or content providers) to bid for advertising their unpaid content (i.e., products/services/web content/etc.) via the electronic marketplace. Such projected bid values are also referred to herein as predicted bid values and are assigned to entries in column 324. In an example, the content server, via the bid prediction module in modules 212 of FIG. 2, may access the dynamic database 214 to secure and process data from the data structure 300 in real time. In such an implementation, instructions associated with the bid prediction module configure the content server to determine membership features of an advertiser to the hosting services of the content server. For example, if the advertiser has a special membership then the advertiser may obtain beneficial bidding privileges. Membership values are assigned based at least in part on the membership features between the advertisers and the website. Thereafter the content server performs pattern recognition using data from the membership values and the data structure 300. For example, the content server is configured to perform a first pattern recognition using the membership values and an estimated or a historical profit for a group of impressions, a second pattern recognition the membership values and an estimated or a historical advertisement revenue for the group of impressions, and a third pattern recognition the membership values and an estimated or a historical credit or charge for the group of impressions. The group of impressions may represent a standard, such as per 1000 impressions of an advertisement, or may represent a small and customized dataset of impressions.

The bid prediction module then determines a bid value for an individual advertiser of the advertisers based at least in part on the first pattern recognition, the second pattern recognition, and the third pattern recognition. For example, the bid value includes a predicted profit from the first pattern recognition, a predicted advertisement revenue from the second pattern recognition, and a predicted credit or charge from the third pattern recognition. The bid value may be the predicted revenue with the predicted credit or charge (subtracted or added), and compared with the predicted profit. The predicted revenue, deducting the predicted profit, provides expenses that may reflect the costs associated with providing advertisements that secure more purchases versus advertisements that secure more references for other advertisers. This helps an advertiser determine their bids for future placements of their advertisements.

This projected or predicted bid value may be provided with a bidding option for at least an individual advertiser of the advertisers. For example, the content server provides the bidding option to advertisers associated with products for securing via the offering or the related offerings on the website hosted by the content server. The bidding option is to determine placement of the paid or sponsored content (i.e., the advertisements) on the webpage. Bids are received as associated with the placement of the paid content on the webpage. The advertisers are ranked in accordance with the bids. The content server may then provide, for electronic publishing with the webpage, a respective paid content (e.g., advertisement) associated with an individual advertiser from the ranking of the advertisers based at least in part on a predetermined criteria, such as a winning bid or a bid above a threshold value.

In another implementation, the ranking of the advertisers may be modified depending on the web action from users visiting the website upon selecting advertisements from the advertisers. When certain advertisements bring in more users to the website, then the ranking of the corresponding advertisers for those advertisements are raised. Alternatively, quality users—defined as those that buy a product or server indicated in an advertisement—are preferred over those that browse the website. As a result, such quality users result in the corresponding advertisements (and related advertiser) to rank higher than other advertisers. In yet another alternative implementation, the rankings are to the advertisements alone, and not the advertisers. In this manner, the advertisements that bring in most users are skewed to a higher rank at a winning bid or at a bid value that is lower than the threshold value. In another aspect, the modification may be implemented to the bid values to increase a ranking of a first advertiser when the web action in the electronic marketplace is associated with securing of a product from a second advertiser. In another example, the modification may be implemented to the bid to decrease a ranking of a first advertiser when the web action in the electronic marketplace is associated with securing of a product from a second advertiser.

In an aspect of this disclosure, the use of the encrypted reference improves latency of the data in both areas, the tracking of the user and the tracking information provided to the retailer. For example, the use of the advertisement ID enables that the tracking for the user is provided in database 300A, but as the separation exists between the databases, the retailer side information may be updated when the server resources are available. As a result of the use of the hash ID to ensure data separation, the present implementation enables efficient computing as it reduces the burden on the content server 208 (including its related computing devices and modules 212-218) to provide value distribution on-the-fly. The content server may then prioritize responses to the user for webpage content than to processing of additional data for updating large data sets.

In addition, the separation of the data allows for separate determination of bid prediction values for the retailers and proper placement of advertisements. Such a process relies on pre-computed bids at near real-time based in part on impressions and conversions from the user tracking portion of the database. At high traffic times, the work-load may be higher and the demand for resources may need to be balanced with respect to the in-demand content. In such instances, pre-computing may be triggered to benefit the retailers in placing bids for their sponsored advertisements.

As a result, the use of the present process for an encrypted identifier in separating the user tracking process from the data provided to the retailer ensure a solution to a network and computer related issue of latency and traffic management for high traffic and high data networks. A user browsing through multiple pages of products may be tracked through the entire browsing process of multiple open webpages of product information without continuous data traffic through the dynamic databases 214. This balances the data management process in the content server 208 (and the related computing devices). This also reduces the work-load to these devices or allows the devices to be used to perform other tasks than providing pages of search results. In addition, this also removes from any requirement to store data in large datasets that may be prone to corruption or backup failures.

Figure 4:
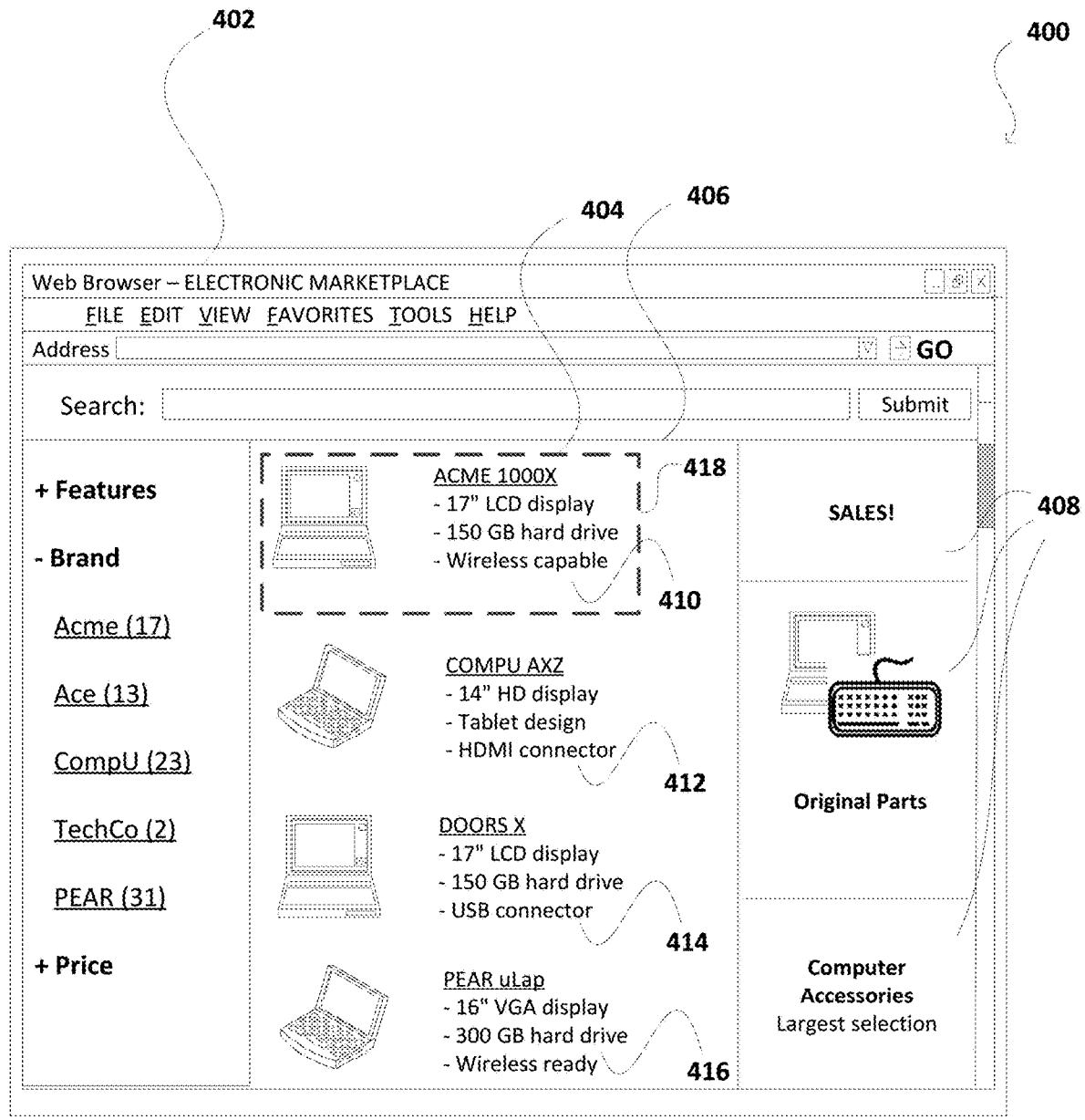
FIG. 4 illustrates an example website for providing offerings associated with content references or identifiers in accordance with embodiments of the disclosure herein.

FIG. 4 illustrates an example website 406 in a browser window 400 for providing offerings associated with content references or identifiers in accordance with embodiments of the disclosure herein. The example website 406 is illustrated as an electronic marketplace 402. FIG. 4 may be studied along with FIG. 1A as a temporal example of when a user reviews advertisements and selects one advertisement from sections 106 in FIG. 1A. For example, the website 406 in FIG. 4 may be provided to a user when the user selects the advertisement for ACME 1000X in the webpage 102 of FIG. 1A. As illustrated in FIG. 4, the selected offering 410, ACME 1000X, in website 406 is highlighted 418 to provide the user with continuity for the selected advertisement. Website 406 is offering computer branded ACME 1000X for sale, along with related offerings 412-416 for other computers. The selected offering 410 and related offerings 412-416 are in an unpaid content section 404 of the website 406. In addition, website 406 may include paid content sections 408 for other paid content available within the website or to other websites. As previously noted, when the user selected the advertised offering 410, the content ID associated with the advertised offering is logged to a purchase (and the counterpart hash ID is logged to a charge). When the user ends up selecting one of the related offerings 412-416, the content ID associated with the advertised offering is logged to a reference (and the counterpart hash ID is logged to a credit).

Figure 5A:
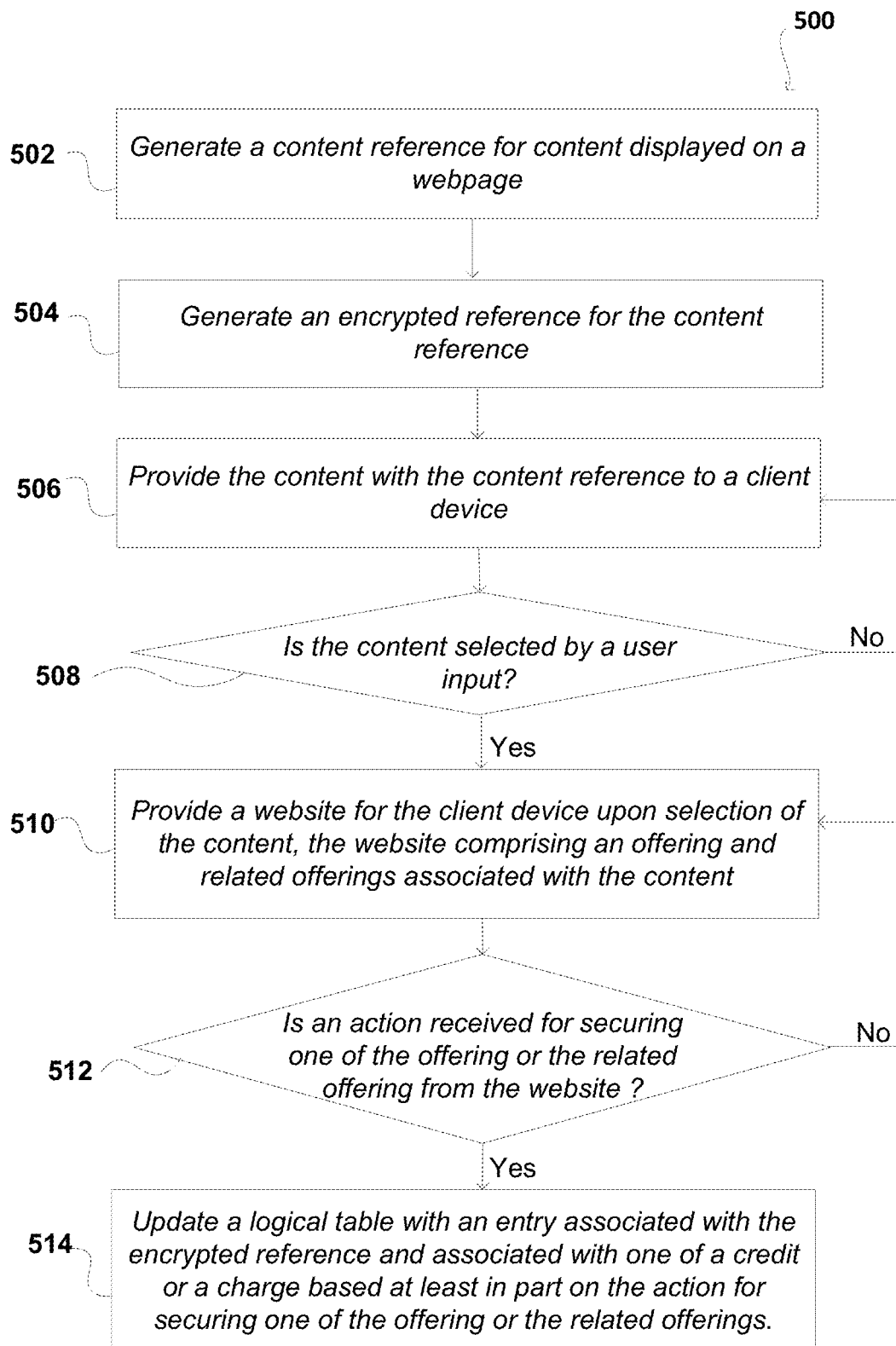
FIG. 5A is a flow diagram of an example process for privately tracking content references or identifiers according to aspects disclosure herein.

FIG. 5A is a flow diagram of an example process 500 for privately tracking content references or identifiers according to aspects disclosure herein. In an example, process 500 may be applied in the configuration of the content server as in FIGS. 1B, 2, and 3. Sub-process 502 provides generation of a content reference for paid content displayed on a webpage. Sub-process 504 generates an encrypted reference for the content reference. The paid content is provided with the content reference to a client device via sub-process 506. In decision sub-process 508, a determination is made as to whether the paid content was selected by a user input. In an example and as previously described, when a user selects or interacts with advertisements on third-party webpages as rendered on a client device, the scripts in the third-party webpages provide information to a corresponding third-party webpage server. Alternatively, the scripts in the third-party webpages may be configured to intimate the content server that a content ID was selected. In either implementation, sub-process 510 provides a website for the client device upon selection of the paid content by the user input on the webpage. When no input is provided to the content on the client device, then sub-process 510 transfers control back to sub-process 506. In an example, sub-process 506 may update the paid content to the webpage or provide an updated webpage with new paid content every few minutes depending on the implementation. This ensures that users may still have options of selecting from new advertisements leading to other or related products or services of the content server.

Further, in sub-process 510, the website provided to the client device includes an offering and related offerings associated with the paid content. When the paid content is an advertisement, such a process is demonstrated via the example of FIG. 4, where the advertised offering 410 is provided along with related offerings 412-416 to the client device. The website of sub-process 510 includes scripts to monitor and/or provide information associated with web actions on the website. In decision sub-process 512, a determination is made as to whether a web action is received from the website. In an implementation, the web actions corresponding to securing products or services may be of particular concern, though other web actions, such as a time spent on a webpage in the website or webpages browsed may be other web actions cataloged by other aspects of this disclosure. Sub-process 512 may be configured as a filter to determine if a select web action is received by a looping process back to the sub-process 510. When sub-process 512 determines that a specified web action is received, then sub-process 514 is applied. In accordance with a web action received from the website, sub-process 514 updates a logical table with an entry associated with the encrypted reference. The update is associated with a credit or a charge based at least in part on the web action for the offering or the related offerings.

Figure 5B:
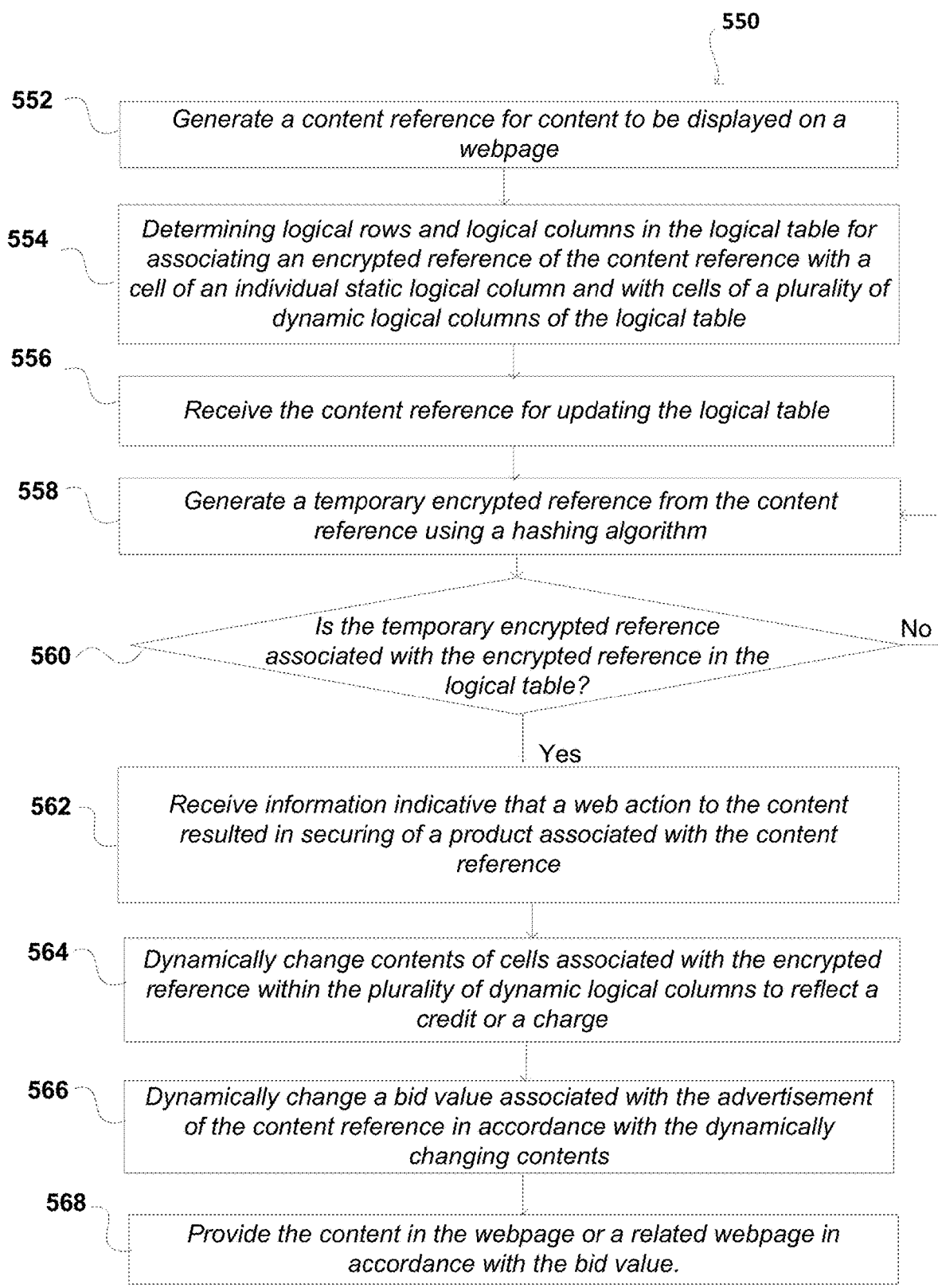
FIG. 5B is a flow diagram of an example process for dynamic bidding based in part on privately tracked content references or identifiers and using a logical table in accordance with various embodiments.

FIG. 5B is a flow diagram of an example process 550 for dynamic bidding based in part on privately tracked content references or identifiers and using a logical table in accordance with various embodiments. In an example, the process 550 may be applied with the example in FIG. 3. Sub-process 552 generates a content reference for paid content to be displayed on a webpage. Sub-process 554 determines logical rows and logical columns in the logical table for associating an encrypted reference of the content reference. As described with respect to FIG. 3, such a logical table may include a predetermined number of the logical columns functioning as dynamic logical columns and a second predetermined number of the logical columns functioning as static logical columns. Sub-process 554 associates the encrypted reference to a cell of an individual static logical column and to cells of a plurality of the dynamic logical columns. Association, as used with respect to sub-process 554, may include entering directly or referencing values by a pointer provided in the cell.

Sub-process 556 receives the content reference when an advertisement is selected and proceeds to update the logical table to indicate a conversion. In an alternate aspect, sub-process 556 receives the content reference by holds it till an indication is made that the content reference is received as part of a web action. Such an alternate aspect would indicate that a purchase or reference, beyond a general conversion has occurred. Sub-process 558 generates a temporary encrypted reference from the content reference using a hashing algorithm. As such, sub-process 558 may be taken as a bridging of data between tables 300A and 300B in FIG. 3. Sub-process 560 is a decision block to determine if the temporary encrypted reference is associated with the encrypted reference in the logical table. When such a determination is not made in the affirmative, then sub-process 560 may cycle back to sub-process 558 for another temporary encrypted reference. In the alternative, error messages may be provided from any of the decision sub-processes in the disclosure herein.

When such a determination is made in the affirmative in sub-process 560, then sub-process 562 receives information indicative that a web action to the unpaid content in the website (e.g., product/service/web content/etc.) has resulted in securing of the underlying product/service/web content/ etc. associated with the content reference. Such information may be a coded descriptor for a PURCHASE or a REFERENCE, as described with respect to FIG. 3. Sub-process 564 dynamically changes contents of cells associated with the encrypted reference. Such an update is reflected in the change to CREDIT and CHARGE columns in table 300B as a result of a PURCHASE or a REFERENCE change occurring in table 300A.

Sub-process 566 may then use the information from sub-process 564 to dynamically change a bid value associated with the advertisement. For example, when the advertisement associated with the content reference results a PURCHASE, it may cause the bid value to decrease, but when the content reference results in a REFERENCE, then it may cause the bid value to increase. Such a relation may be seen from the view of the advertiser associated with the content reference—when the content reference results in a REFERENCE, the advertiser secures a credit and may cause the advertiser to advertise more often; and when the content reference results in a PURCHASE, the advertiser may be strongly incentivized to provide more advertisements because of a lower bid value. Sub-process 568 provides the paid content in the webpage or a related webpage in accordance with the bid value.

Figure 5C:
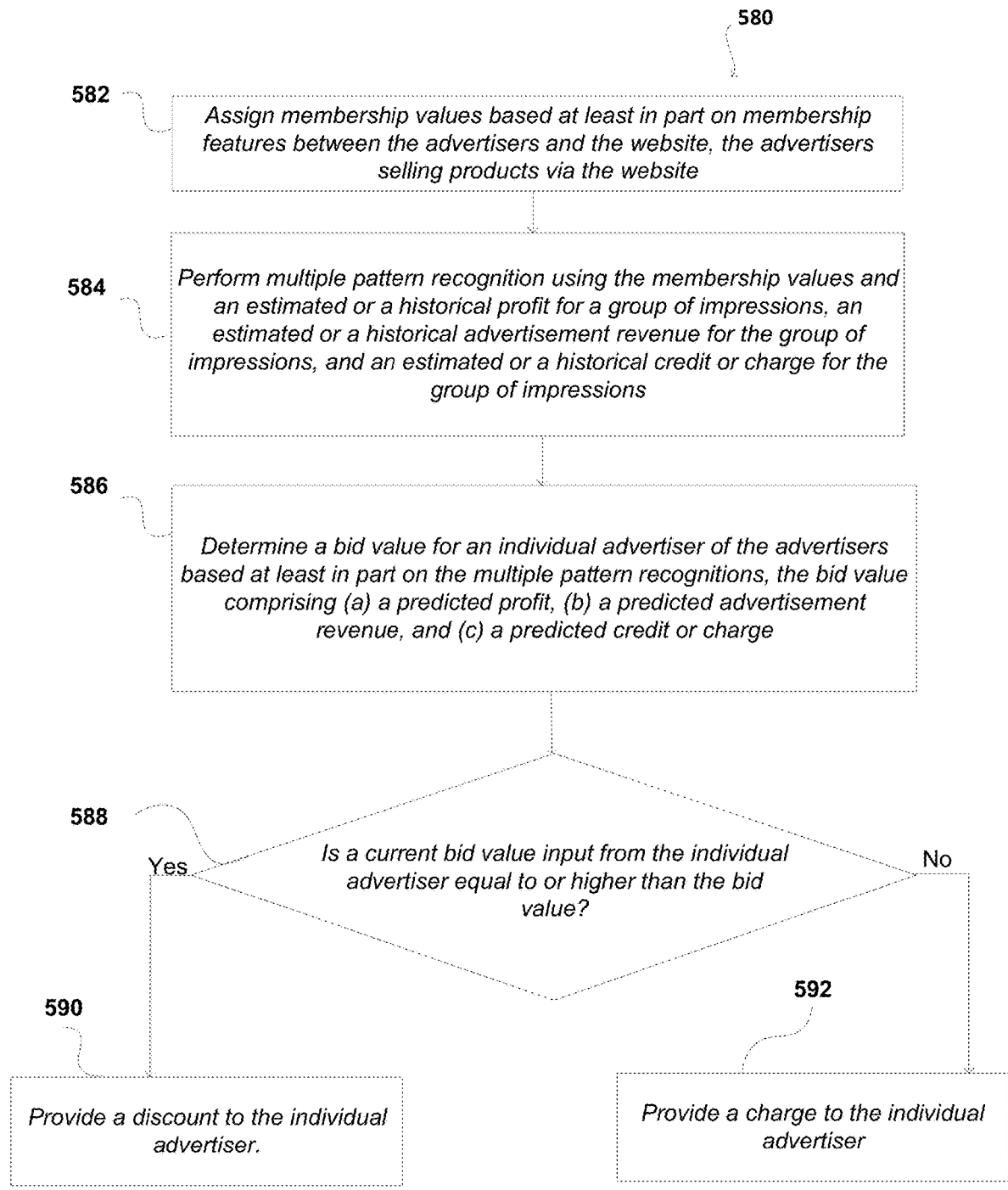
FIG. 5C is a flow diagram of an example process for distributing advertising value based in part on privately tracked content references or identifiers in accordance with various embodiments.

FIG. 5C is a flow diagram of an example process 580 for distributing advertising value based in part on privately tracked content references or identifiers in accordance with various embodiments. The process 580 may be studied along with the embodiments of FIGS. 2 and 3 to provide additional paid content. As described with reference to FIG. 3, sub-process 582 assigns membership values based at least in part on membership features between the advertisers and the website. For example, advertisers may have varying levels of memberships in order to sell products or services via registration with the website. Sub-process 584 performs multiple pattern recognition using data from the membership values and data obtained from real time advertising. For example, sub-process 584 performs a first pattern recognition using the membership values and an estimated or a historical profit for a group of impressions, a second pattern recognition the membership values and an estimated or a historical advertisement revenue for the group of impressions, and a third pattern recognition the membership values and an estimated or a historical credit or charge for the group of impressions. The group of impressions may represent a standard, such as per 1000 impressions of an advertisement, or may represent a small and customized dataset of impressions.

Sub-process 586 determines a bid value for an individual advertiser of the advertisers based at least in part on the first pattern recognition, the second pattern recognition, and the third pattern recognition. For example, the bid value includes a predicted profit from the first pattern recognition, a predicted advertisement revenue from the second pattern recognition, and a predicted credit or charge from the third pattern recognition. The bid value may be the predicted revenue with the predicted credit or charge (subtracted or added), and compared with the predicted profit. The predicted revenue, deducting the predicted profit, provides expenses that may reflect the costs associated with providing advertisements that secure more purchases versus advertisements that secure more references for other advertisers. This helps an advertiser determine their bids for future placements of their advertisements. Sub-process 588 provides a determination as to whether a current bid value from an individual advertiser is equal to or higher than the bid value determined in sub-process 586. When the current bid value from the individual advertiser is equal to or higher than the bid value determined in sub-process 586, then a discount is provided to the individual advertiser via sub-process 590. When the current bid value from the individual advertiser is not equal to or higher than the bid value determined in sub-process 586, then a charge is provided to the individual advertiser via sub-process 592.

Figure 6:
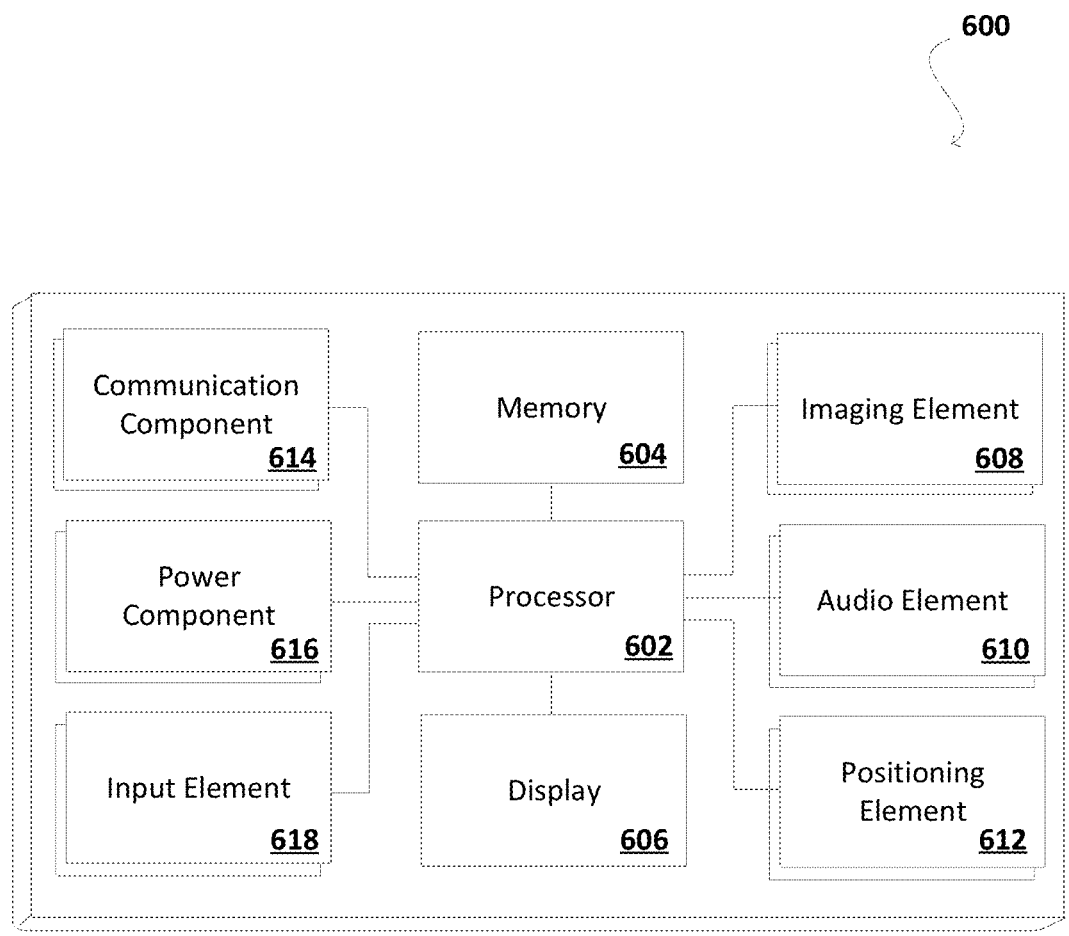
FIG. 6 illustrates an example computing device for performing one or more of the disclosed embodiments.

FIG. 6 illustrates an example configuration of components 602-618 of an example computing device 600, such as client computing devices 134 and 224 illustrated in FIGS. 1B and 2, or the computing devices generally disclosed throughout this disclosure. Components 602-618 are a set of basic components for a computing device, but alternative or different arrangements are applicable for any of the disclosed computing devices in this disclosure, without changing the features in the embodiments above. In the example of FIG. 6, the computing device 600 includes at least one processor 602 for executing instructions that can be stored in a memory device or element 604. As would be apparent to one of ordinary skill in the art, upon reading this disclosure, that the computing device 600 can include many types of memory, data storage or computer-readable media, such as a data storage for program instructions for execution by the processor 602.

The same or separate storage than memory 604 can be used for data and a removable memory can be available for sharing information with other devices. Further, any number of communication approaches can be available for sharing the information with other devices. Furthermore, it would also be apparent to one of ordinary skill, upon reading this disclosure, that processor 602 may be multiple processors, each with processing tasks for the embodiments here, and may collectively act as a processor for the embodiments herein.

The computing device 600 includes at least one type of screen or display element 606, such as a touch screen, electronic ink (e-ink), organic light emitting diode (OLED) or liquid crystal display (LCD), although devices such as portable media players might convey information via other means, such as through audio speakers. The computing device 600, in an example, may also include at least image capture element 608. The image capture element 608 can include any appropriate technology, such as a CCD or CMOS image capture element having a sufficient resolution, focal range and viewable area, to capture an image.

The example computing device 600 additionally includes at least one position sensor 612, such as an accelerometer, digital compass, electronic gyroscope or inertial sensor, which can assist in determining movement or other changes in position or orientation of the device 600. The device 600 can include input elements 618 that are available to receive conventional input from a user. This conventional input can include, for example, radio-communications type wand devices, hand or gesture sensors, a push button, touch pad, touch screen, wheel, joystick, keyboard, mouse, trackball, keypad or any other such device or element whereby a user can input a command to the device. The conventional input, in one example, interfaces with the UI to move pointers or indicators on the UI, as in the case of the finger or stylus. One more of the input elements 618, in an example, are connected to the computing device 600 by a wireless IR or Bluetooth® or other link. In an embodiment, computing device 600 might not include any buttons at all and might be controlled only through a combination of visual and audio commands such that a user can control the computing device without having to be in contact with the computing device.

Furthermore, the computing device 600 includes, in another example, communication component 614 and audio element 610 representing various communication features for the computing device to commute with near and far devices. For example, using Bluetooth®, Wi-Fi®, and other communication protocols. The computing device 600 is powered by power component 616 which may include batteries, power adapters, or any other power producing or providing component.

The various embodiments can be implemented in a wide variety of operating environments, which in some cases can include one or more user computers, computing devices, or processing devices which can be used to operate any of a number of applications. User or client devices can include any of a number of personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. Each of these example systems are configured based on the detailed disclosure herein and are therefore specific, in application, to the processes of content display.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art, upon reading this disclosure, for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infra-red network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl®, Python®, or TCL, as well as combinations thereof. The server(s) may also include database servers, including without limitation those commercially available from Oracle®, Microsoft®, Sybase®, and IBM®.

The environment can include a variety of databases and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, the embodiments above teach customization of hardware that may be used with software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor; and
   memory including instructions that, when executed by the at least one processor, cause the system to:
   generate a content identifier (ID) and a reference link for displayed content, the reference link referencing an offering;
   generate a hash ID for the content ID using a hashing algorithm;
   associate the content ID and the hash ID with a cell of an individual static logical column and with cells of a plurality of dynamic logical columns in a logical table;
   detect at least one user interaction with the reference link from the client device;
   in response to detecting the at least one user interaction with the reference link from the client device, provide the offering and one or more related offerings to a client device;
   determine, in response to the activation of the reference link, a web action associated with the offering or the one or more related offerings;
   update the plurality of dynamic logical columns in the logical table with information associated with the web action taken with respect to at least one of the offering or the one or more related offerings, the information referenced by the hash ID; and provide a charge or a credit to a content provider associated with the content based at least in part on the information from the update.

2. The system of claim 1, wherein the instructions when executed further cause the system to:
receive a notification that the content is selected on the client device; and
provide products related to the content for purchasing via an electronic marketplace.

3. The system of claim 1, wherein the instructions when executed further cause the system to:
determine the content in accordance with a product available for securing from an electronic marketplace;
monitor that the action is for securing the product referenced in the offering; and
associate the charge, in the logical table, to the content provider.

4. The system of claim 1, wherein the instructions when executed further cause the system to:
determine the content in accordance with a first product available for securing from the offering in an electronic marketplace;
monitor that the action corresponds to an action to secure a second product in the one or more related offerings; and
associate the credit, in the logical table, to the content provider.

5. The system of claim 1, wherein the instructions when executed further cause the system to:
monitor that the action is for securing a product associated with the offering; and
update the logical table with information associated with the credit or the charge and the content provider associated with the content ID.

6. A computer-implemented method, comprising:
generating, using a processor, an encrypted reference for a reference;
generating, using the processor, a reference link associated with the reference;
associating the encrypted reference with a cell of an individual static logical column and with cells of a plurality of dynamic logical columns in a logical table;
providing information associated with the reference to a client device;
detecting at least one user interaction with the reference link;
in response to detecting the at least one user interaction with the reference link, providing an offering and one or more related offerings associated with the information to the client device;
determining, in response to the activation of the reference link, a web action associated with the offering or the one or more related offerings; and
updating, using the processor, the plurality of dynamic logical columns in the logical table with an entry associated with the encrypted reference and associated with a credit or a charge based at least in part on the web action taken with respect to at least one of the offering or the one or more related offerings.

7. The computer-implemented method of claim 6, further comprising:
determining that the information associated with the reference is selected by a user of the client device;
determining product information associated with the reference to provide to the client device as part of a website comprising the offering and the one or more related offerings;
providing an option to secure a product associated with the product information from the website as part of the offering; and
in response to selection of the option, updating the logical table with information for the credit or the charge associated with the encrypted reference.

8. The computer-implemented method of claim 6, further comprising:
providing a bidding option to advertisers associated with products for securing via the offering or the one or more related offerings on a website, the bidding option to determine placement of the information associated with the reference on a webpage;
receiving bids associated with the placement of the information associated with the reference on the webpage;
ranking the advertisers in accordance with the bids;
providing, for electronic publishing with the webpage, a respective content associated with an individual advertiser from the ranking of the advertisers based at least in part on a predetermined criterion.

9. The computer-implemented method of claim 8, further comprising:
modifying the ranking of the advertisers in accordance with the action.

10. The computer-implemented method of claim 9, further comprising:
modifying a respective bid to increase a ranking of a first advertiser when the action is associated with securing of a product from a second advertiser.

11. The computer-implemented method of claim 9, further comprising:
modifying a respective bid to decrease a ranking of a first advertiser when the action is associated with securing of a product from a second advertiser.

12. The computer-implemented method of claim 8, further comprising:
assigning membership values based at least in part on membership features between the advertisers and the website;
performing: (a) a first pattern recognition using the membership values and an estimated or a historical profit for a group of impressions, (b) a second pattern recognition using the membership values and an estimated or a historical advertisement revenue for the group of impressions, and (c) a third pattern recognition using the membership values and an estimated or a historical credit or charge for the group of impressions;
determining a bid value for an individual advertiser of the advertisers based at least in part on the first pattern recognition, the second pattern recognition, and the third pattern recognition, the bid value comprising (a) a predicted profit, (b) a predicted advertisement revenue, and (c) a predicted credit or charge; and
providing the bid value with the bidding option for at least the individual advertiser of the advertisers.

13. The computer-implemented method of claim 6, further comprising:
applying a hashing algorithm to the reference, the reference comprising alphabets, numerals, or alphanumeric values, the hashing algorithm providing the encrypted reference as output.

14. The computer-implemented method of claim 6, further comprising:
receiving the reference that is associated with an advertisement;
generating a temporary encrypted reference from the reference using a hashing algorithm;

determining an association of the temporary encrypted reference and the encrypted reference;

receiving information indicative that the action resulted in securing of a product associated with the reference;

dynamically changing contents of cells associated with the encrypted reference within the plurality of dynamic logical columns to reflect the credit or the charge;

dynamically changing a bid value associated with the advertisement in accordance with the dynamically changing contents; and providing the advertisement as the information associated with the reference in a webpage.

15. The computer-implemented method of claim 6, further comprising:

associating content references with cells of an individual logical column in the logical table, the content references associated with advertisements;

receiving sales information for a product;

identifying an individual content reference from the content references that is associated with an individual advertisement for the product or an advertiser of the product;

associating the sales information with the individual content reference;

applying a hashing algorithm to the individual content reference to generate an individual encrypted reference;

determining that the individual encrypted reference is associated with the encrypted reference; and associating the credit or the charge to the advertiser or against the product in accordance with the action by providing an entry that is associated with the encrypted reference in the logical table or a related logical table.

16. The computer-implemented method of claim 15, wherein the association of the credit or the charge is: (a) the credit when the action is to secure the product or (b) the charge when the action is to secure a related product associated with a related advertiser.

17. A non-transitory computer-readable storage medium storing instructions that, when executed by at least one processor of a computing system, cause the computing system to:

generate an encrypted reference for a content reference;

generate a reference link associated with the content reference:

associate the encrypted reference with a cell of an individual static logical column and with cells of a plurality of dynamic logical columns in a logical table;

provide content associated with the content reference to a client device;

detect at least one user interaction with the reference link;

in response to detecting the at least one user interaction with the reference link, provide an offering and one or more related offerings associated with the content;

determine, in response to the activation of the reference link, a web action associated with the offering or the one or more related offerings;

in accordance with the web action taken with respect to at least one of the offering or the one or more related offerings, update the plurality of dynamic logical columns in the logical table with information associated with the encrypted reference, the updating associated with a credit or a charge based at least in part on the web action.

18. The non-transitory computer-readable storage medium of claim 17, wherein the instructions when executed further cause the computing system to:

determine that the content is selected by a user of the client device;

determine product information associated with the content to provide to the client device as part of a website;

provide an option to secure a product associated with the product information from the website as part of the offering; and in response to selection of the option, update the logical table with information for the credit or the charge associated with the encrypted reference.

19. The non-transitory computer-readable storage medium of claim 17, wherein the instructions when executed further cause the computing system to:

provide a bidding option to advertisers associated with products for securing via the offering or the one or more related offerings, the bidding option to determine placement of the content on a webpage;

receive bids associated with the placement of the content on the webpage;

rank the advertisers in accordance with the bids;

provide, for electronic publishing with the webpage, a respective content associated with an individual advertiser from the ranking of the advertisers based at least in part on a predetermined criterion.

20. The non-transitory computer-readable storage medium of claim 17, wherein the instructions when executed further cause the computing system to:

apply a hashing algorithm to the content reference, the content reference comprising alphabets, numerals, or alphanumeric values, the hashing algorithm providing the encrypted reference as output.

* * * * *